Sept. 24, 1957   H. C. LEHDE   2,807,734
TORQUE TRANSMITTING DEVICE
Filed Nov. 22, 1954   3 Sheets-Sheet 1

INVENTOR.
HENRY C. LEHDE
BY Charles P. Boberg
ATTORNEY

Sept. 24, 1957  H. C. LEHDE  2,807,734
TORQUE TRANSMITTING DEVICE
Filed Nov. 22, 1954  3 Sheets-Sheet 2

INVENTOR.
HENRY C. LEHDE
BY Charles P. Boberg
ATTORNEY

Sept. 24, 1957          H. C. LEHDE          2,807,734
                  TORQUE TRANSMITTING DEVICE
Filed Nov. 22, 1954                     3 Sheets-Sheet 3

INVENTOR.
HENRY C. LEHDE
BY Charles P. Boberg
           ATTORNEY

United States Patent Office 2,807,734
Patented Sept. 24, 1957

2,807,734

TORQUE TRANSMITTING DEVICE

Henry C. Lehde, Brooklyn, N. Y., assignor to Control Instrument Company, Brooklyn, N. Y., a corporation of New York Application November 22, 1954, Serial No. 470,228

3 Claims. (Cl. 310—103)

The present invention relates to torque transmitting devices such as brakes and clutches which are dependent on magnetic hysteresis for their operation.

The primary object of this invention is to provide a torque transmitting device of the aforesaid type which can be adjusted to a given value of torque with extreme accuracy and ease.

Another object of the invention is to provide an adjusting means for such a device which is simple, reliable and accurate.

Still another object is to adapt the principle of the present invention to the design of an accurate, inexpensive and easily operated dynamometer which is very well adapted for measuring the power output of small motors.

Still another object of the invention is to provide a magnetic clutch or like device wherein the amount of torque transmitted between members is controlled by a simple axial adjustment which is not hindered by undue axial forces.

In its general organization the invention makes use of a magnetic field obtained from either a permanent magnet or an electromagnet operating in conjunction with an armature of permanent magnet material. ("Permanent magnet material," for present purposes, may be understood to mean any magnetic material having a relatively high hysteresis coefficient. The torque is controlled and magnetic stabilization is effected by simultaneously rotating and withdrawing either the armature or the field structure with respect to the other. While this general arrangement is known to the art, in the present invention these results are now attained with higher accuracy and without the exertion of the appreciable force ordinarily associated with maintaining or varying a magnetic gap. This is made possible by certain unique features of construction which cause the magnetic forces to be directed radially rather than axially and in such a manner as to balance each other insofar as their effect upon the adjusting mechanism is concerned.

Other objects and features of the invention will be pointed out in the following description and claims and illustrated in the accompanying drawings, which disclose, by way of examples, the principle of the invention and the best mode, which has been contemplated, of applying that principle.

Figure 1:
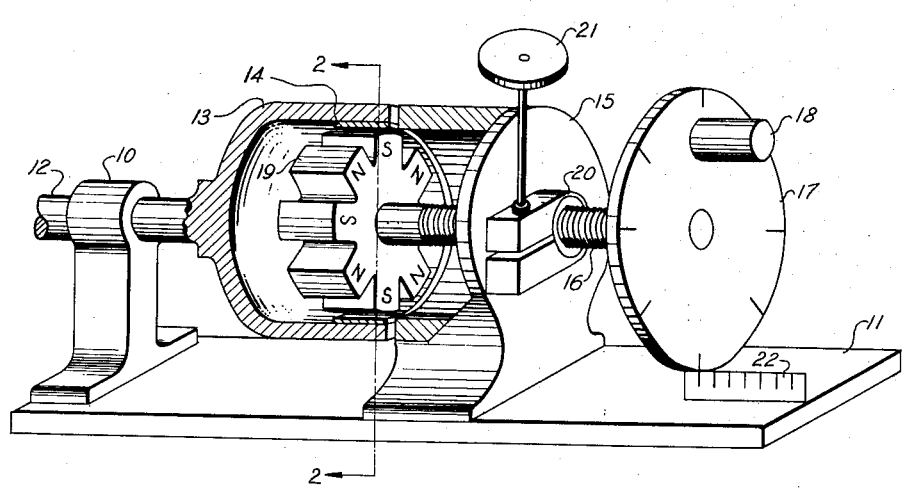
Fig. 1 is a partially sectional, perspective view of a simple dynamometer embodying the present invention.

Referring to Fig. 1, a bearing bracket 10 mounted on the base plate 11 supports a shaft 12 which is journaled therein. To the end of shaft 12 is fastened a cup-shaped housing 13, made of soft iron. A ring 14, of permanent magnet material, is fitted to the inside of the housing 13. Another soft iron cup-shaped housing 15 is attached to the base plate 11 and faces the rotatable housing 13. A shaft 16 threaded for most of its length passes through a central opening in the housing 15. The shaft 16 can be rotated manually by means of the attached disc 17 and handle 18. At the other end of shaft 16 is attached a permanent magnet 19 having a number of radial north and south poles, respectively designated N and S.

The magnet 19 can be accurately positioned axially with respect to the ring 14 and the housing 15, by rotating the disc 17. A clamp 20, operated by the knob 21, is used to hold the shaft 16 and thereby secure the magnet 19 at any desired axial position. By this means the magnet 19 may be located entirely within the ring 14, or partially or wholly withdrawn from the ring 14 into the stationary housing 15. The axial position of the magnet 19 is accurately established by reference to the circular scale on disc 17 and the cooperating straight scale 22 mounted on the base plate 11. The scale 22 indicates the number of revolutions of disc 17, while the graduations on disc 17 indicate portions of a revolution.

Figure 2:
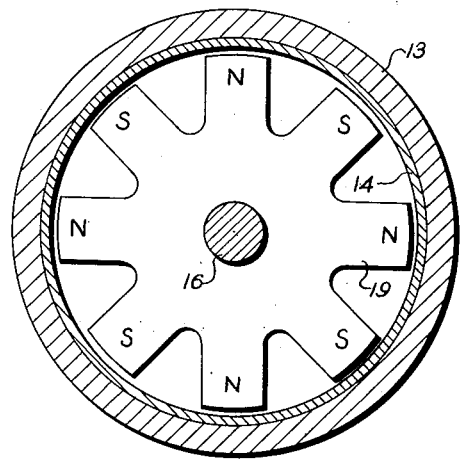
Fig. 2 is a section taken on the line 2—2 in Fig. 1.

If now the shaft 12 is rotated by some external power source, the ring 14 Fig. 2 will rotate about the stationary magnet 19. The permanent magnet material in ring 14 will pass through a number of cycles of magnetization during every revolution. The attendant hysteresis loss is supplied by power from shaft 12, which must apply a torque dependent on the amount of magnetization of the ring 14 and the position of the stationary magnet 19 with respect ot the ring 14. The arrangement is thus capable of applying a very precisely adjusted braking torque to the shaft 12. As such it is well adapted for use as a dynamometer to measure the running torque of motors, provided certain precautions are observed in design and operation.

It has been observed that the hysteresis torque obtained with the magnet 19 at a given axial position may be subject to disturbing effects. If the ring 14 should be allowed to rotate with the magnet 19 as the magnet is withdrawn into the housing 15, the local magnetic poles induced in the ring 14 would not be erased. Consequently these poles would remain to a certain extent when the magnet 19 is partially withdrawn from the ring 14 and the ring is rotated by an external power source. The braking torque thus produced would have a definite irregularity or roughness at low speeds, caused by interaction of the local poles with the magnet 19, and the average braking torque also might be modified.

A similar effect would be produced if the pitch of the screw thread on shaft 16 were so large that the magnet 19 would be withdrawn too rapidly and would not produce an adequate number of stabilizing magnetic cycles in the ring 14 during withdrawal. In design of the equipment it is therefore necessary to select a sufficiently small pitch, and during the adjustment of the magnet 19 it is necessary to keep shaft 12 from rotating.

It will be appreciated that due to the balanced radial effect of the magnetic forces, very little axial force need be exerted on the magnet 19 to move it axially away from the ring 14 and into the housing 15. No appreciable axial restraining force is exerted on housing 13 or ring 14 by the radially directed magnetic flux lines. This would not be true if the magnetic air gaps were to extend in an axial direction, as they do in conventional devices. The device will operate satisfactorily if housing 15 is omitted but in that case some axial force may have to be exerted upon shaft 12. With the housing 15 present, there will be no great change in flux linkages and the flux lines always will be radial, so that no axial pull is exerted by the magnetic field.

While the hysteresis torque produced is substantially independent of the speed at which shaft 12 is rotated, eddy currents may be induced in both the ring 14 and the housing 13. This would produce an additional torque proportional to the speed of rotation, which may be of the order of 5% of the hysteresis torque. The effect can be reduced by laminating the portion of housing 13 which holds the ring 14. Also, a speed correction may be applied to the static torque as indicated by reference to dial 17 and scale 22.

Figure 3:
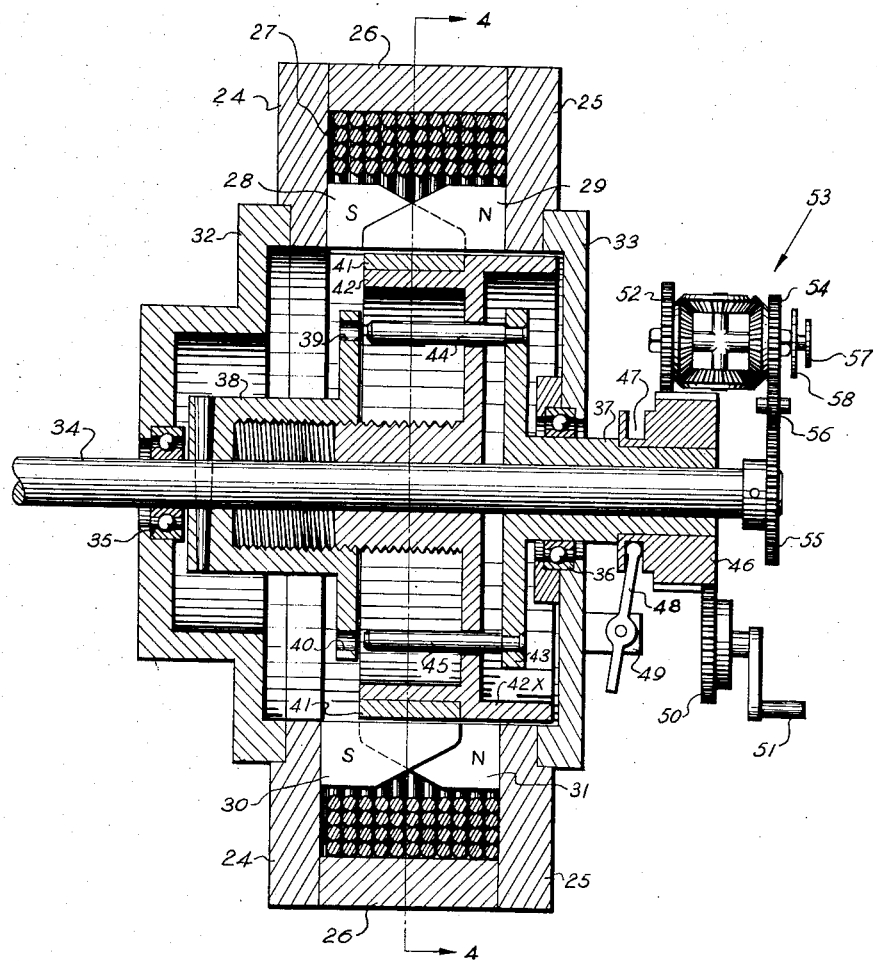
Fig. 3 is a vertical sectional view of another dynamometer embodying the present invention.

Fig. 3 is a vertical section through a modified form of dynamometer employing an external electromagnet to develop the magnetic field. The external stationary field structure consists of the flat soft iron rings 24 and 25 fastened to the ring 26. The single large field coil 27 is energized by electric current, in this case direct current. A number of pole pieces are attached to the rings 24 and 25 so that alternate N and S poles are located around the inner circumference of the field structure. The pole pieces 28, 29, 30 and 31, Figs. 3 and 4, which will be referred to again hereinafter, are typical of these.

End bells 32 and 33, Fig. 3, fastened to rings 24 and 25, respectively, support a shaft 34 through bearings 35 and 36 and a bushing 37. A bushing 38 keyed to the shaft 34 has an internal thread and a flanged extension in which a series of holes are located. Of these holes, two which are numbered 39 and 40 are shown in Fig. 3. A ring 41 of permanent magnet material is mounted on a soft iron wheel 42, which in turn is mounted on but not fastened to the shaft 34. The outside surface of the hub of wheel 42 is threaded and engages with the internal thread of bushing 38. Wheel 42 has an extension $42x$ of soft iron which is similar in shape and adjacent to the magnetic ring 41.

The bushing 37 is free to slide on the shaft 34 and within the bearing 36. This bushing 37 has a large flange 43 on which are mounted two diametrically opposite, axially extending pins 44 and 45. These pins 44 and 45 are passed through holes in the web of wheel 42 in order that they can engage with a pair of holes in the flange of bushing 38 which are diametrically opposite one another. In Fig. 3 pins 44 and 45 are shown about ready to engage the holes 39 and 40, respectively, which are two of the series of holes on the flange of bushing 38.

Fastened on bushing 37 is a gear 46 having a groove 47 cut in its hub. In this groove is inserted an end of a lever 48 which is mounted on an extension 49 of bell 33. Movement of the lever 48 is employed to slide the bushing 37 axially on shaft 34, causing the pins 44 and 45 to become engaged with the holes 39 and 40, respectively, for effecting operation of the device, or to be disengaged to enable the torque to be adjusted.

In the engaged position of these parts the wheel 42 rotates with the shaft 34. In the disengaged position thereof wheel 42 rotates with the bushing 37 while riding on the threaded portion of bushing 38. Rotation of the bushing 37 while the pins 44 and 45 are disengaged from bushing 38 causes wheel 42 to rotate, and since bushing 38 will not rotate in this position (if shaft 34 is not allowed to rotate), the hub of wheel 42 will be screwed axially into or out of the bushing 38. In the disengaged position of the pins 44 and 45, the bushing 37 can be rotated by turning a handle 51 which drives the gear 46 through a pinion 50.

Figure 4:
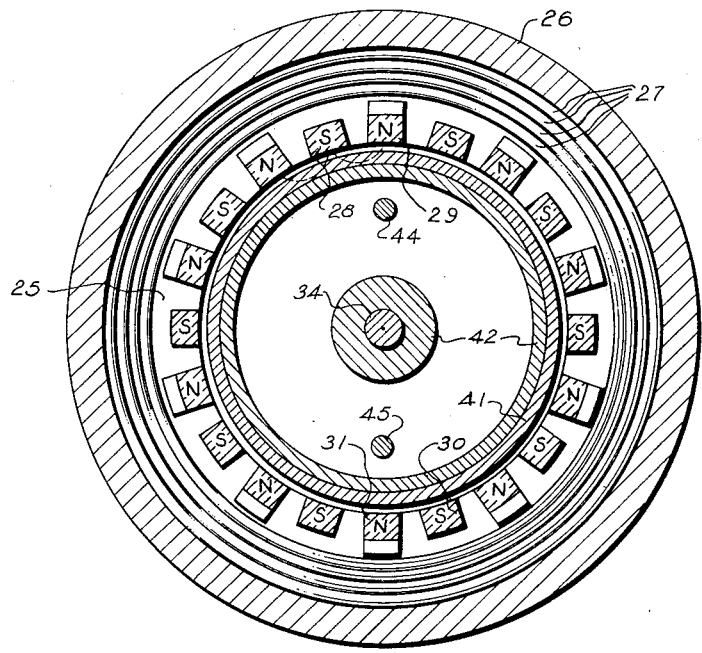
Fig. 4 is a section taken on the line 4—4 in Fig. 3.

The axial position of the wheel 42 relative to the bushing 38 determines the axial position of the permanent magnet ring 41 within the magnetic field developed by coil 27. The flux paths of this magnetic field pass through the alternately spaced N and S poles, of which four, numbered 28, 29, 30 and 31, are shown in Fig. 3. The permanent magnet ring 41 can occupy a greater or lesser portion of these flux paths according to its axial position. Figure 4 is a section taken on Fig. 3 and shows the manner in which the radial flux field is achieved. A typical flux path may be traced from "N" pole 29 through the permanent magnet ring 41 to "S" pole 28. Because the reluctance of the ring material is much lower than that of air, the flux takes the generally radial path through the ring 41 rather than following a direct transverse route from "N" pole 29 through the air gap to "S" pole 28.

Returning to Fig. 3, it is seen that the greatest magnetic coupling through the ring 41 is achieved when the wheel 42 is almost completely withdrawn from the bushing 38. As the wheel 42 moves deeper into the bushing 38, the ring 41 is removed progressively from the flux field. As the ring 41 is withdrawn from the field, the soft iron wheel extension $42x$ enters the flux field and presents a radial flux path in order to minimize any axial magnetic pull on the wheel 42.

After the ring 41 has been adjusted to the desired axial position, the pins 44 and 45 are inserted in holes 39 and 40 respectively by moving the lever 48. The wheel 42 and ring 41 are thereby rigidly fixed to shaft 34. The torque required to rotate shaft 34 depends on the axial position of ring 41 with respect to the stationary field structure surrounding the ring 41.

Since the magnetic forces present in the device are directed substantially in a radial direction where they do not impede axial movement of ring 41, torque adjustments may be made accurately and easily. It will be understood that adjustment of the ring 41 must be made with current flowing in the field coil 27, in order that the ring 41 may undergo proper magnetic stabilization.

In Fig. 3 there is illustrated a mechanism for indicating the torque adjustments which have been made. The gear 52, which is one input to a mechanical differential designated generally as 53, is permanently enmeshed with the axially movable gear 46. The other input gear 54 is driven by a gear 55 on shaft 34 through the idler 56. When gear 46 is locked into bushing 38, any rotation of shaft 34 presents equal and opposite inputs to the differential 53, and the indicator 57 of differential 53 will not rotate. Indicator 57 is associated with a stationary dial 58. When, however, gear 46 is not locked to bushing 38, there can be relative rotary motion between shaft 34 and gear 46, and this will be shown by indicator 57. This indicator then measures the axial position of the ring 41 with respect to the external field structure and thereby becomes a measure of the torque setting.

With the ring 41 withdrawn from the field structure and the soft iron extension $42x$ disposed in alignment with the field, the torque produced will be due to a combination of hysteresis and eddy current effects in the extension $42x$. This will never be zero. The torque may, however, be reduced to zero at this axial position by omission of the extension $42x$ though at the expense of producing a small axial restraining force on the wheel 42 when adjustments of ring 41 are being made.

Figure 5:
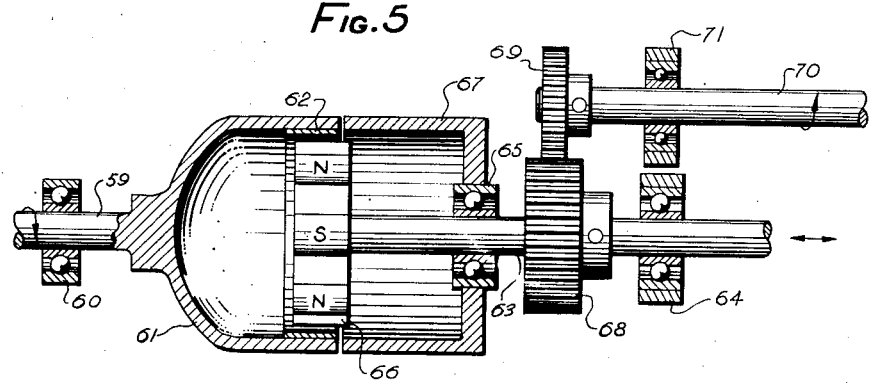
Fig. 5 is a horizontal sectional view of an adjustable-torque magnetic clutch embodying the present invention.

Fig. 5 is a horizontal section through a clutch employing the invention to transmit torque from one rotating shaft to another.

A driving shaft 59, which is supported by bearing bracket 60, has attached to it a housing 61 which has fitted within it a ring 62 of permanent magnet material. A shaft 63, which is supported by bearing bracket 64 and bearing 65, has attached to it a permanent magnet 66 having a number of radial north and south poles, respectively designated N and S. Bearing 65 is fitted into housing 67 which is of soft iron material.

Shafts 59 and 63 are coupled to one another by means of the flux linking the permanent magnet 66 and the ring 62. The amount of flux linking 66 and 62 depends upon the axial position of the magnet 66 with respect to the ring 62. When magnet 66 is wholly within the ring 62, the maximum linkage is achieved and when 66 is wholly without 61 there is no coupling between shafts 59 and 63 and the flux paths originating in the magnet 66 are completed radially through the soft iron housing 67. The amount of coupling which is fixed by the axial position of shaft 63 in bearing 65, determines the maximum torque transmitted from shaft 59 to shaft 63.

A gear 68, fitted to shaft 63, has teeth sufficiently broad to engage gear 69 when shaft 63 is in either extreme axial position. Torque is transmitted from shaft 63 through the mesh of gears 68 and 69 to shaft 70 which is supported by bearing bracket 71.

The embodiment shown in Fig. 5 allows shaft 70 to be driven in rotary motion by the driving shaft 59 with the maximum value of torque transmitted from shaft 59 to shaft 70 determined by the axial position of shaft 63 in bearing 65.

The invention is claimed as follows:

1. A device for transmitting an adjustable predeterminable torque between two members capable of relative rotary motion about an axis, said device comprising means attached to one of the members for producing a radial magnetic field, a ring of permanent magnet material connected to the other of said members and so disposed wtih respect to said axis as to establish magnetic flux paths extending radially, thereby to complete the magnetic circuits originating in the magnetic field, said ring and said magnetic field-producing means being so arranged that at least one of them is movable along said axis relative to the other for varying the amount of magnetic coupling between them, a soft iron structure so disposed with respect to said axis to establish radial magnetic flux paths capable of completing those magnetic circuits originating in the magnetic field which are not coupled with the permanent magnet ring and thereby minimize the axial magnetic forces by preventing the establishment of magnetic air gaps in an axial direction, and calibrated adjusting means for adjusting the relative axial positions of said field-producing means and said permanent magnet material ring to enable the selection of a desired torque to be transmitted between said members.

2. A device for transmitting an adjustable predeterminable torque between two shafts one of which is rotatable about a given axis relative to the other, said device comprising a permanent magnet field structure connected to one of said shafts and disposed about said axis as a center, said field structure being adapted to maintain a magnetic field in fixed relation to itself and including peripherally spaced alternate north and south poles directed radially with respect to said axis, a ring of permanent magnet material connected to the other of said shafts substantially in concentric relation to said field structure and being so disposed with respect to said poles as to establish magnetic flux paths extending radially between said ring and the respective poles, said field structure and the shaft connected therewith being movable along said axis relative to the other shaft for varying the amount of magnetic coupling between the shafts, a soft iron structure so disposed with respect to said axis as to establish radial magnetic flux paths capable of completing those magnetic circuits originating in said field structure which are not coupled with the said permanent magnet ring, thereby to minimize any axial magnetic forces by preventing the establishment of magnetic air gaps in an axial direction, adjusting means for adjusting the relative axial positions of the shafts, and calibration means associated with said adjusting means for indicating the relative axial position of said permanent magnet field structure and said permanent magnet ring thereby to indicate the torque transmitted between said shafts.

3. A device for transmitting an adjustable predeterminable torque between two rotatable shafts, one of which is a driving shaft and one of which is a driven shaft, through the medium of a third shaft, said device comprising a permanent magnet field structure connected at its center to said third shaft, said field structure being adapted to maintain a magnetic field in fixed relation to itself and including peripherally spaced alternate north and south poles directed radially with respect to said third shaft, a ring of permanent magnet material connected to the said driving shaft substantially in concentric relation to said field structure and being so disposed with respect to said poles as to establish magnetic flux paths extending radially between said ring and the respective poles, adjusting means for adjusting the axial position of said third shaft for varying the amount of magnetic coupling between said field structure and said ring, a soft iron structure so disposed with respect to said third shaft as to establish radial magnetic flux paths capable of completing those magnetic circuits through the poles of said field structure which do not pass through said permanent magnetic ring, thereby to minimize any axial magnetic forces by preventing the establishment of magnetic air gaps in an axial direction, and means to couple said third shaft to said driven shaft for all positions of said third shaft, thereby transmitting to said driven shaft the torque transmitted to said third shaft from said driving shaft through the medium of said field structure and said ring, and calibration means associated with said adjusting means for indicating the relative axial position of said permanent magnet field structure and said permanent magnet material connected to the driving shaft thereby indicating the torque transmitted between said driving shaft and said driven shaft.

References Cited in the file of this patent

UNITED STATES PATENTS

| | | |
|---|---|---|
| 2,129,529 | Howard | Sept. 6, 1938 |
| 2,193,214 | Winther | Mar. 12, 1940 |
| 2,536,207 | Norman | Jan. 2, 1951 |